US008817358B2

(12) United States Patent  
Hong et al.

(10) Patent No.: US 8,817,358 B2
(45) Date of Patent: Aug. 26, 2014

(54) THIN FILM STACK WITH SURFACE-CONDITIONING BUFFER LAYERS AND RELATED METHODS

(75) Inventors: John Hyunchul Hong, San Clemente, CA (US); Isak Clark Reines, San Diego, CA (US); Chong Uk Lee, San Diego, CA (US); Tallis Young Chang, San Diego, CA (US); Yaoling Pan, San Diego, CA (US); Edward Keat Leem Chan, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 105 days.

(21) Appl. No.: 13/565,688

(22) Filed: Aug. 2, 2012

(65) Prior Publication Data

US 2014/0036340 A1  Feb. 6, 2014

(51) Int. Cl.
*G02B 26/00* (2006.01)
*G02F 1/03* (2006.01)

(52) U.S. Cl.
USPC ............................................ 359/290; 359/260

(58) Field of Classification Search
USPC .................................. 359/237, 260, 290, 291
See application file for complete search history.

(56) References Cited

U.S. PATENT DOCUMENTS

2006/0118824 A1* 6/2006 Otsuka et al. ................. 257/194
2009/0087986 A1 4/2009 Lee et al.
2009/0250736 A1 10/2009 Yoon et al.
2011/0042713 A1 2/2011 Takano et al.
2011/0284815 A1 11/2011 Kim et al.

FOREIGN PATENT DOCUMENTS

FR 2883661 A1 9/2006
FR 2924231 A1 5/2009
WO 2009134211 A1 11/2009

OTHER PUBLICATIONS

Bae, et al., "Effects of initial layer surface roughness on GMR performance of Si/Cu/NiFe/Cu/Co/Cu/NiFe dual spin-valves for MRAM", IEEE Transactions on Magnetics, Sep. 2000, pp. 2850-2852, vol. 36, No. 5.
International Search Report and Written Opinion—PCT/US2013/053387—ISA/EPO—Feb. 10, 2014.
Partial International Search Report—PCT/US2013/053387—ISA/EPO—Nov. 29, 2013.

* cited by examiner

*Primary Examiner* — William Choi
(74) *Attorney, Agent, or Firm* — Weaver Austin Villeneuve & Sampson, LLP

(57) ABSTRACT

This disclosure provides systems, methods and apparatus for a thin film stack with surface-conditioning buffer layers. In one aspect, the thin film stack includes a plurality of thin film layers each having a thickness greater than about 10 nm and a plurality of surface-conditioning buffer layers each having a thickness between about 1 nm and about 10 nm. The surface-conditioning buffer layers are alternatingly disposed between the thin film layers. Each of the surface-conditioning buffer layers are formed with the same or substantially the same thickness and composition. In some implementations, the surface-conditioning buffer layers are formed by atomic layer deposition.

23 Claims, 14 Drawing Sheets

Common Voltages

| | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

THIN FILM STACK WITH SURFACE-CONDITIONING BUFFER LAYERS AND RELATED METHODS

TECHNICAL FIELD

This disclosure relates generally to thin films and more particularly to multilayer thin film stacks in electromechanical systems devices.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

A device structure such as an electromechanical systems (EMS) device structure can include multilayer stacks of thin films. The stacks can be formed by sequential deposition of thin films of various materials.

SUMMARY

The systems, methods and devices of the disclosure each have several innovative aspects, no single one of which is solely responsible for the desirable attributes disclosed herein.

One innovative aspect of the subject matter described in this disclosure can be implemented in a thin film stack. The thin film stack includes a plurality of thin film layers each having a thickness greater than about 10 nm and a plurality of surface-conditioning buffer layers each having a thickness between about 1 nm and about 10 nm and alternatingly disposed between the plurality of thin film layers. Each of the plurality of surface-conditioning buffer layers is formed with the same or substantially the same thickness and composition.

In some implementations, each of the surface-conditioning buffer layers is deposited by atomic layer deposition (ALD). In some implementations, each of the surface-conditioning buffer layers includes an oxide. In some implementations, a thin film stress of each of the thin film layers disposed on a surface-conditioning buffer layer is independent of underlying thin film layers. In some implementations, the plurality of thin film layers includes a lower thin film stack having one or more lower thin film layers, a neutral plane layer over the lower thin film stack, and an upper thin film stack having one or more upper thin film layers and over the neutral plane layer, where the upper thin film layers and the lower thin film layers are symmetrically identical in thickness and composition across the neutral plane layer.

Another innovative aspect of the subject matter described in this disclosure can be implemented in a thin film stack. The thin film stack includes a plurality of thin film layers each having a thickness greater than about 10 nm and means for providing a uniform deposition surface alternatingly disposed between the plurality of thin film layers, the uniform deposition surface conditioning means formed by atomic layer deposition and having the same or substantially the same thickness and composition between each of the thin film layers.

In some implementations, the uniform deposition surface conditioning means includes an oxide. In some implementations, the uniform deposition surface conditioning means has a thickness between about 1 nm and about 10 nm. In some implementations, the plurality of thin film layers forms part of a resonator, cantilever, balanced structure, gyroscope, bolometer, accelerometer, microelectromechanical systems, or nanoelectromechanical systems device.

Another innovative aspect of the subject matter described in this disclosure can be implemented in a method of manufacturing a thin film stack. The method includes providing a base layer having a thickness greater than about 10 nm, and depositing by atomic layer deposition a first buffer layer on the base layer, where the first buffer layer has a thickness between about 1 nm and about 10 nm. The method further includes depositing a first thin film layer on the first buffer layer, where the first thin film layer has a thickness greater than about 10 nm. The method further includes depositing a second buffer layer on the first thin film layer under identical or substantially identical deposition conditions as the first buffer layer. The method further includes depositing a second thin film layer on the second buffer layer, where the second thin film layer has a thickness greater than about 10 nm.

In some implementations, the second buffer layer is identical or substantially identical in thickness and composition as the first buffer layer. In some implementations, depositing by atomic layer deposition the second buffer layer includes providing a deposition surface, for the second thin film layer, substantially identical to a deposition surface of the first buffer layer independent of the first thin film layer and the base layer. In some implementations, the first and the second buffer layers include an oxide.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
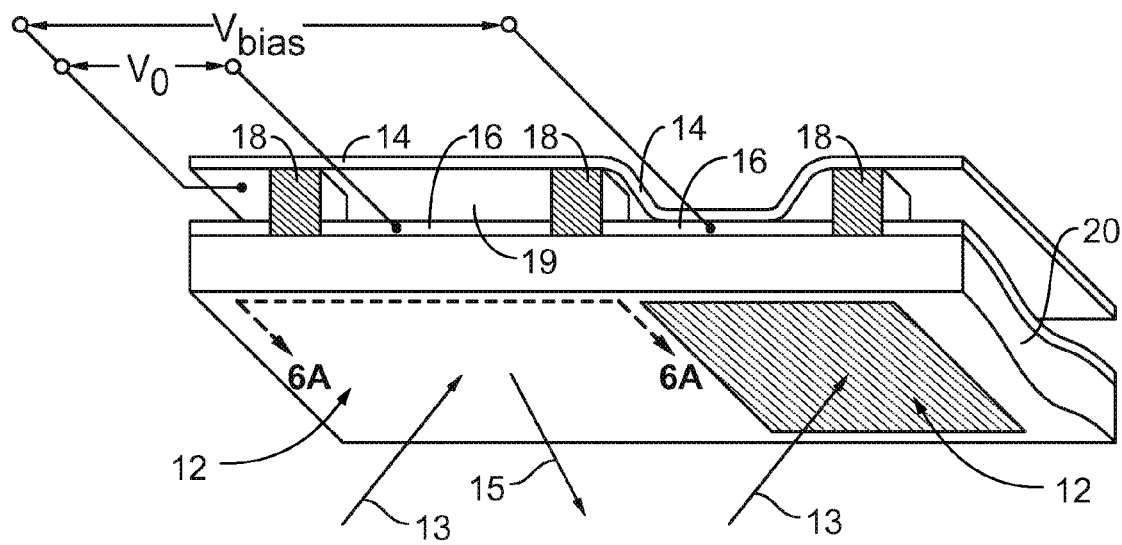
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., electromechanical systems (EMS), MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

Some implementations described herein relate to a thin film stack for a device structure with surface-conditioning buffer layers. A thin film stack can include a plurality of thin film layers and a plurality of surface-conditioning buffer layers alternatingly disposed between the thin film layers. In some implementations, each of the thin film layers can have a thickness greater than about 1 nm, and each of the surface-conditioning buffer layers can have a thickness between about 1 nm and about 10 nm. The surface-conditioning buffer layers can be identical or substantially identical in thickness and composition. In some implementations, the surface-conditioning buffer layers are formed by atomic layer deposition. In some implementations, the surface-conditioning buffer layers include an oxide.

Particular implementations of the subject matter described in this disclosure can be implemented to realize one or more of the following potential advantages. The use of a surface-conditioning buffer layer provides a uniform and repeatable chemical and physical surface upon which subsequent layers can be deposited. This affords precise tuning and balancing for deposition of subsequent thin film layers. In particular implementations, the use of a surface-conditioning buffer layer can provide precise control of thin film stresses. For example, the stresses in each thin film layer of device structures such as resonators, cantilevers, balanced structures, gyroscopes, bolometers, accelerometers, MEMS, and NEMS devices can be independent of the stresses in the underlying layers. This can reduce bending forces that could otherwise lead to undesirable bending and/or buckling.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the IMOD 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the IMOD 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the IMOD 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated IMOD 12 on the right in FIG.

1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
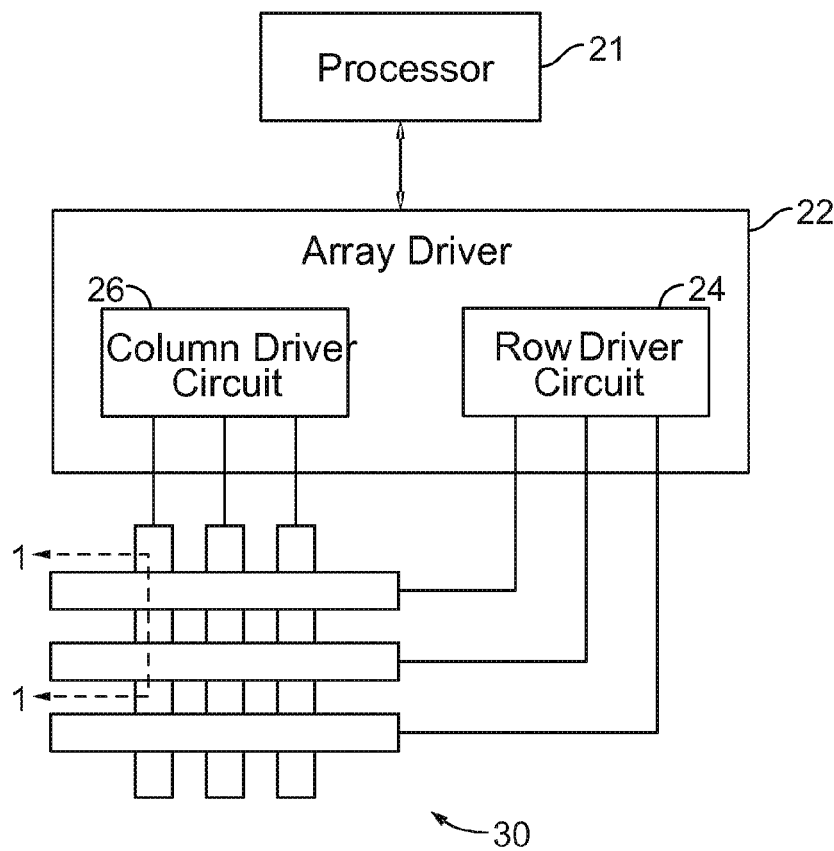
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
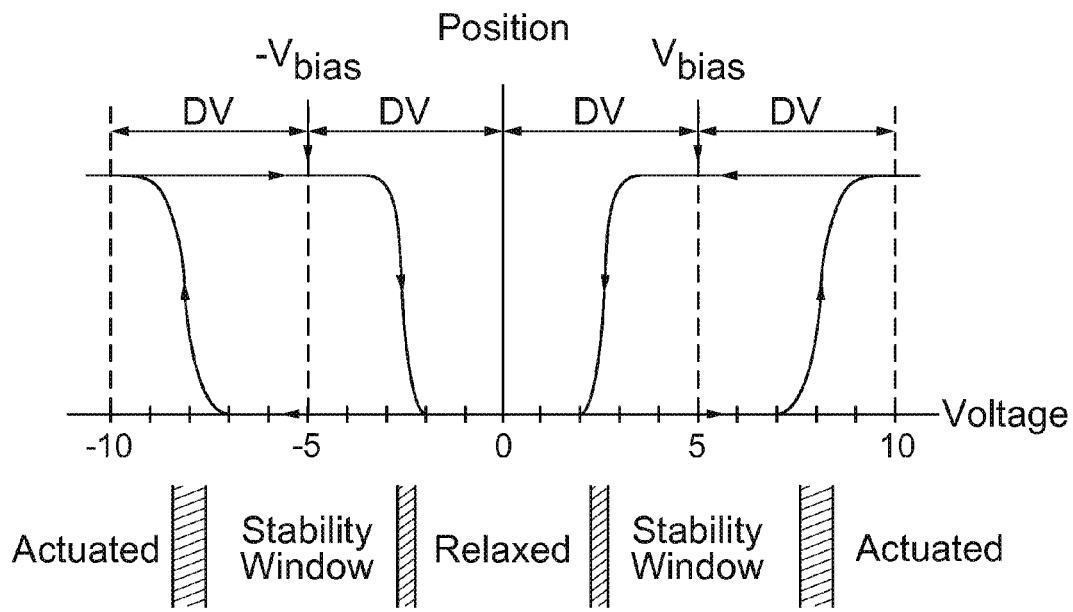
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10 volts, however, the movable reflective layer does not relax completely until the voltage drops below 2 volts. Thus, a range of voltage, approximately 3 to 7 volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10 volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7 volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
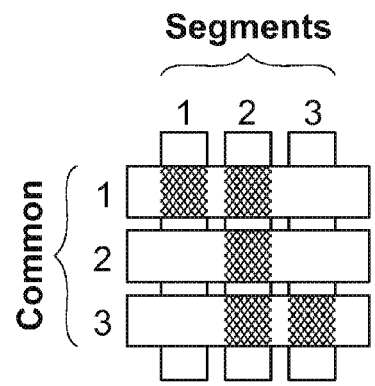
FIG. 5A shows an example of a diagram illustrating a frame of display data in the 3×3 interferometric modulator display of FIG. 2.
Figure 5B:
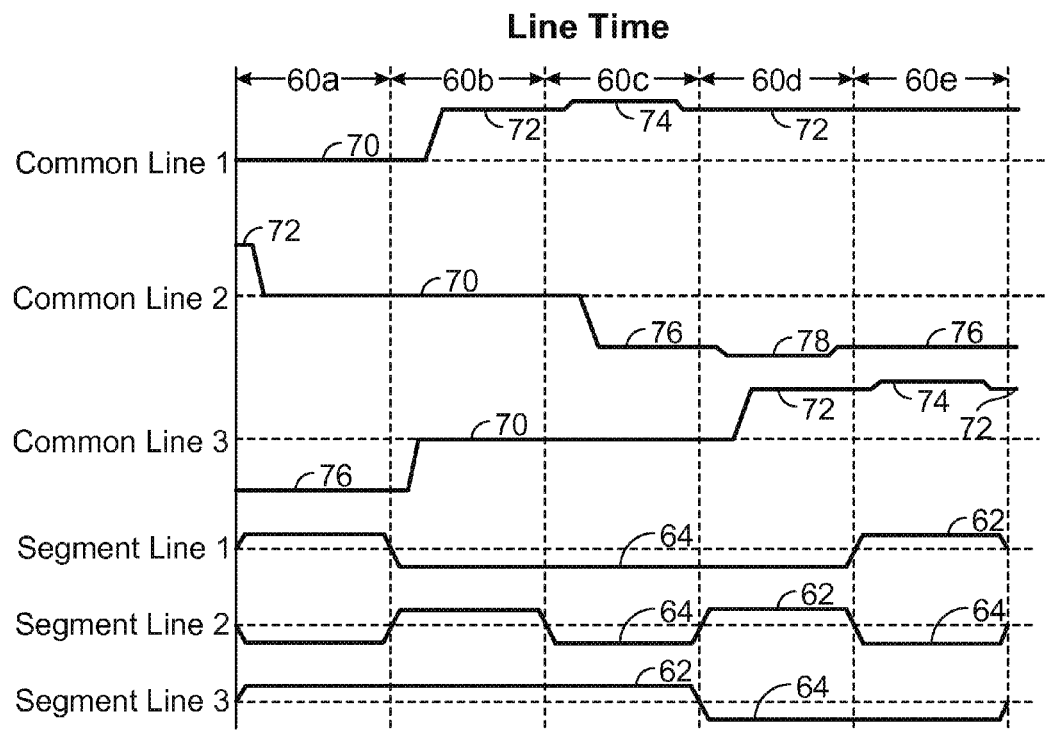
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a, a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
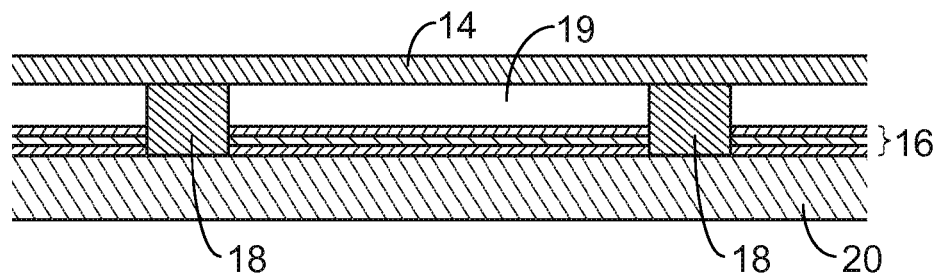
FIG. 6A shows an example of a partial cross-section of the interferometric modulator display of FIG. 1.
Figure 6B:
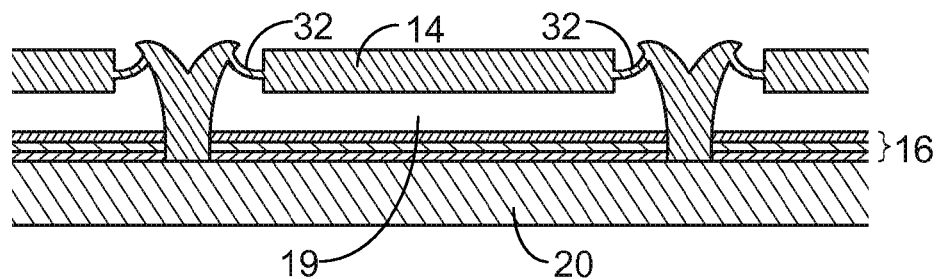
FIGS. 6B-6E show examples of cross-sections of varying implementations of interferometric modulators.
Figure 6C:
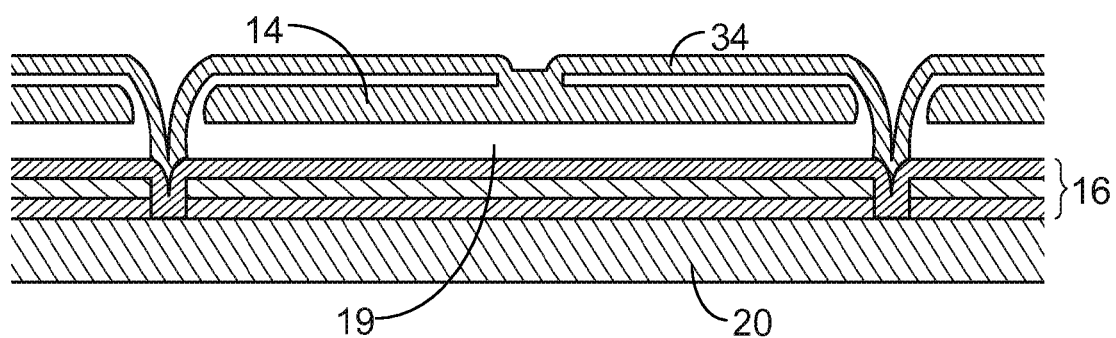

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
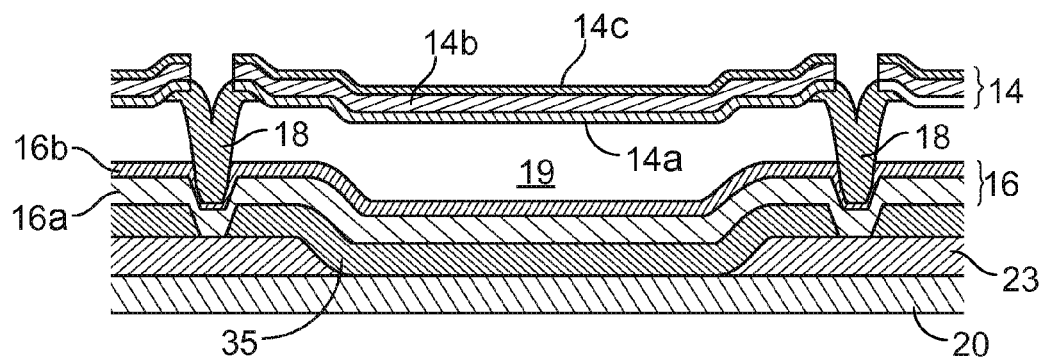

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, an $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane (CFO and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
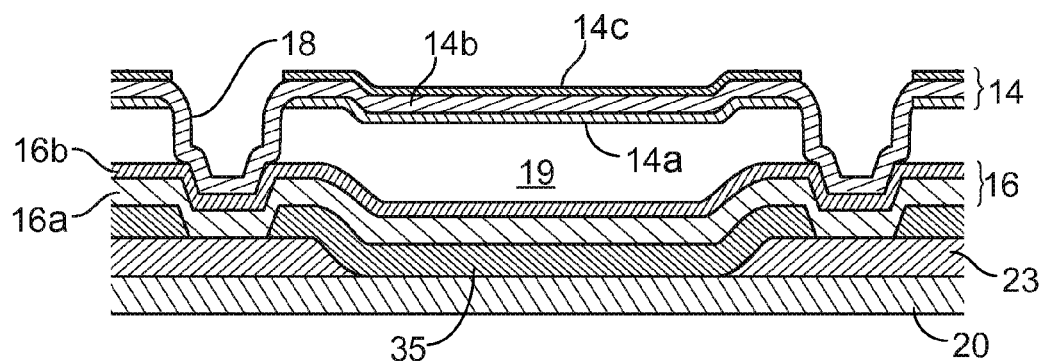

FIG. 6E shows another example of an IMOD, where the movable reflective layer 14 is self-supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
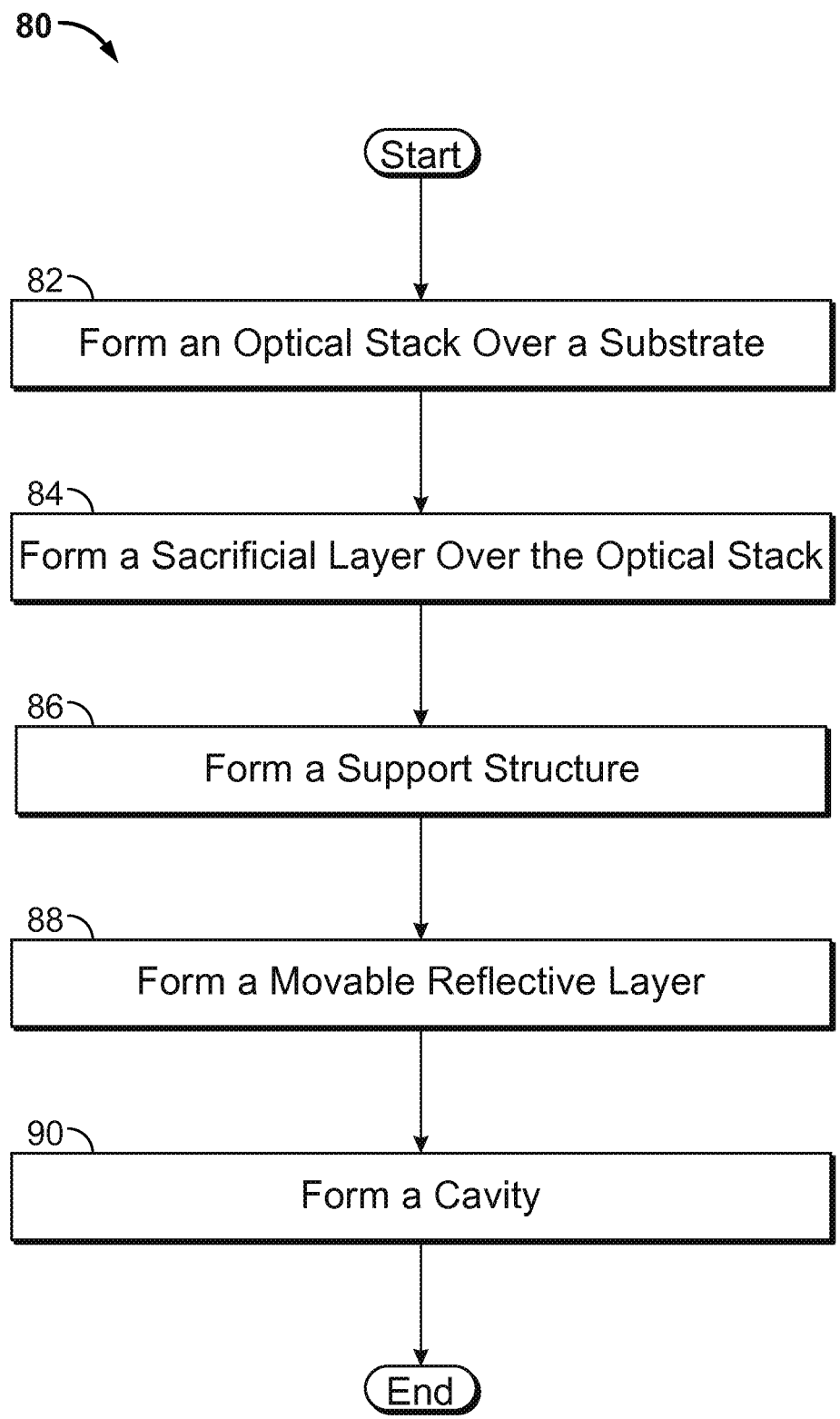
FIG. 7 shows an example of a flow diagram illustrating a manufacturing process for an interferometric modulator.
Figure 8A:
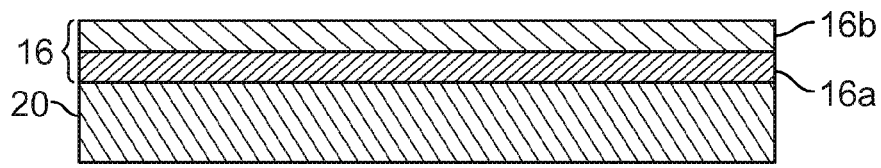
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
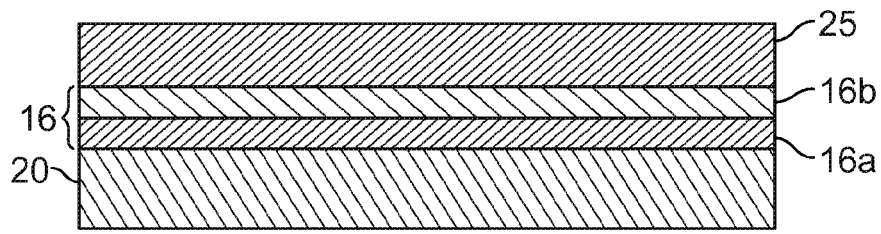

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
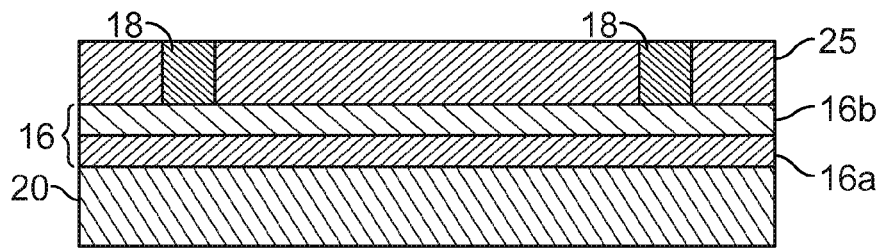

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning to remove portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
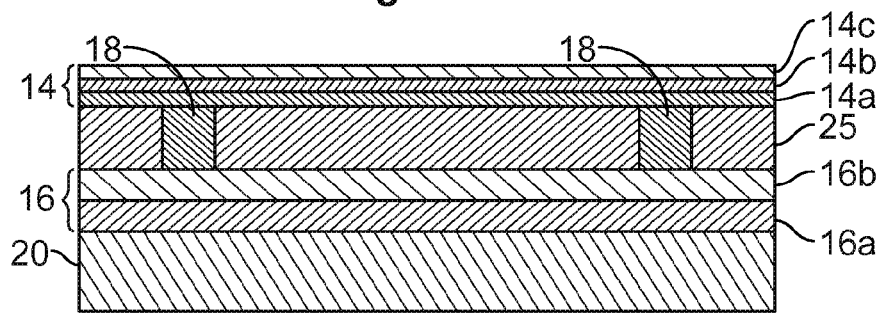
Figure 8E:
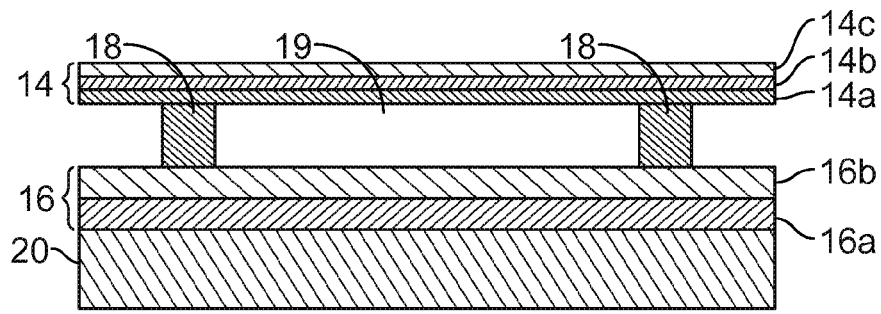

The process 80 continues at block 88 with the formation of a movable reflective layer or membrane such as the movable reflective layer 14 illustrated in FIGS. 1, 6 and 8D. The movable reflective layer 14 may be formed by employing one or more deposition processes, e.g., reflective layer (e.g., aluminum, aluminum alloy) deposition, along with one or more patterning, masking, and/or etching processes. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other combinations of etchable sacrificial material and etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Fabrication of IMODs and other EMS devices can include deposition of stacks of thin film layers. In thin film deposition, the material of an underlying layer on which a thin film is deposited can affect the stress and other physical properties of the deposited thin film. Interfacial stress in a thin film stack of a device structure can impact the performance of the device structure. Each thin film layer can exhibit different stresses originating from, for example, epitaxial stresses, thermal stresses, and intrinsic or growth stresses. Epitaxial stresses can arise from lattice mismatches, thermal stresses can arise from coefficient of thermal expansion (CTE) mismatches, and intrinsic stresses can arise from deposition conditions. Thin film layers of different sizes, compositions, and deposition conditions can yield different degrees of stresses.

Thin film stress can generally be measured using Stoney's equation, which correlates the change of radius of curvature of a thin film with stress:

$$\sigma_f = E_s t_s^2 \kappa / [6(1-\nu_s) t_f]$$

In this equation, the subscripts f and s are used to denote film and substrate, respectively, while E and ν represent the Young's modulus and Poisson ratio, respectively. The thickness of the film and substrate are represented by $t_f$ and $t_s$, respectively. The film stress, $\sigma_f$, is related directly to the change in the radius of curvature, κ.

Using the principles of Stoney's equation, thin film stress can be measured with laser scanning technology by measuring the change in radius of curvature caused by the deposition of a stressed thin film on a substrate. The substrate with the deposited thin film can be scanned in multiple directions, for example, in the 0 degree direction and 90 degree direction, to provide greater accuracy of the change in radius of curvature. An example of a thin film stress measurement tool is the FLX-2320-S, manufactured by Toho Technology Corporation in Aichi, Japan. The 1-sigma accuracy of the FLX-2320-S thin film stress measurement tool for a 300 nm film on a 525 μm thick substrate is about 3.33 MPa.

Many device structures such as resonators, cantilevers, balanced structures, MEMS devices, and NEMS devices can include multilayer thin film stacks whose stresses and other physical properties can vary from layer to layer.

In some implementations, device structures such as resonators, cantilevers, balanced structures, gyroscopes, bolometers, accelerometers, and other MEMS devices and NEMS devices may include balanced and tuned stresses of thin film layers on uniform and repeatable deposition surfaces. In forming such device structures, each successive thin film layer may be deposited with a substantially common starting condition as the previous thin film layer. As a result, each successively deposited thin film layer can have stress values independent of the underlying layers.

Figure 9:
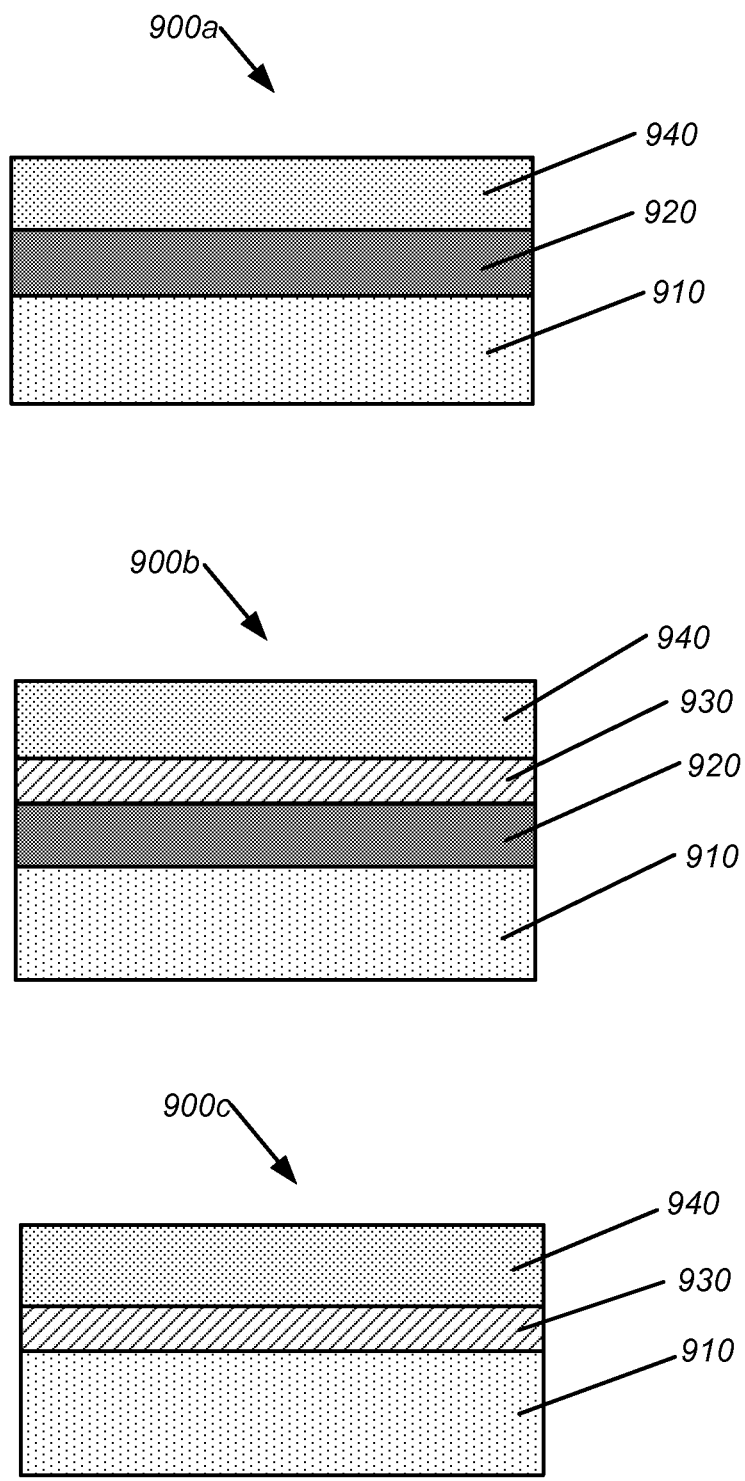
FIG. 9 shows examples of cross-sectional schematic illustrations of three different thin film stacks with and without surface-conditioning buffer layers.

The underlying layer on which a thin film is deposited can affect the stress of the deposited thin film. A surface-conditioning buffer layer can provide a uniform deposition surface that can minimize or control the stress effects of the underlying layer. FIG. 9 shows examples of cross-sectional schematic illustrations of three different thin film stacks 900a-900c deposited on a substrate 910 with and without surface-conditioning buffer layers.

In each of the examples in FIG. 9, a thin film layer 940 is deposited over different underlying materials. The thin film layer 940 can be a SiO₂ layer deposited by PECVD, for example. In the example of thin film stack 900a in FIG. 9, the thin film layer 940 is deposited over a first thin film layer 920, with the first thin film layer 920 deposited over a substrate 910. The first thin film layer 920 can be, for example, a sacrificial layer such as a Mo sacrificial layer deposited by sputter deposition or other PVD process, for example. The substrate 910 can be, for example, a Si or glass substrate.

In one example, a thin film stack corresponding to thin film stack 900a was deposited, with the substrate 910 being a Si substrate having a thickness of about 525 μm, the first thin film layer 920 being sputter-deposited Mo sacrificial layer having a thickness of about 200 nm, and the thin film layer 940 being a PECVD-deposited SiO₂ layer having a thickness of about 300 nm. An average stress value of the thin film layer 940 was calculated based on scanning measurements in both the 0 degree and 90 degree directions. In this example, the average stress value of the thin film layer 940 was calculated to be about −106 MPa. Calculations of the average stress value for thin film layer 940 are taken from the scanning measurement data provided in Table I below.

In the example of thin film stack 900b in FIG. 9, the thin film stack 900b can also include the thin film layer 940 over the first thin film layer 920 and the substrate 910. The difference between the thin film stack 900b and the thin film stack 900a is that the thin film layer 940 is deposited over a surface-conditioning buffer layer 930 in the thin film stack 900b. The surface-conditioning buffer layer 930 can be deposited by atomic layer deposition (ALD), and have a thickness between about 1 nm and about 20 nm, such as about 10 nm. In some implementations, the surface-conditioning buffer layer 930 can include aluminum oxide ($Al_2O_3$). In one example, a thin film stack corresponding to thin film stack 900b was deposited, with the substrate 910 being a Si substrate having a thickness of about 525 μm, the first thin film layer 920 being sputter-deposited Mo sacrificial layer having a thickness of about 200 nm, the surface-conditioning buffer layer 930 being an ALD-deposited $Al_2O_3$ layer having a thickness of about 10 nm, and the thin film layer 940 being a PECVD-deposited SiO₂ layer having a thickness of about 300 nm. Calculations of the average stress value for thin film layer 940 were taken from data provided in Table I below. The average stress value of the thin film layer 940 was measured to be about −146 MPa based on scanning measurements in both the 0 degree and 90 degree directions. This is significantly different than the −106 MPa average stress value measured for the thin film stack 900a without the surface-conditioning buffer layer 930 described above. Hence, the addition of the surface-conditioning buffer layer 930 substantially alters the stress of the thin film layer 940.

In the example of thin film stack 900c in FIG. 9, the thin film stack 900c can also include the thin film layer 940 over the surface-conditioning buffer layer 930. The difference between the thin film stack 900c and the thin film stack 900b is that the layer underlying the surface-conditioning buffer layer 930 only includes the substrate 910 in the thin film stack 900c. In one example, a thin film stack corresponding to thin film stack 900c was deposited, with the surface-conditioning buffer layer 930 being an ALD-deposited $Al_2O_3$ layer having a thickness of about 10 nm, and the thin film layer 940 being a PECVD-deposited SiO₂ layer having a thickness of about 300 nm. The average stress value of the thin film layer 940 was measured to be about −155 MPa, with calculations of the average stress value for thin film layer 940 based on data provided in Table I below. This is similar to the average stress value of −146 MPa calculated for the thin film stack corresponding to the thin film stack 900b described above, with the average stress values of the thin film layer 940 with the ALD-deposited surface-conditioning buffer layers 930 being less than about 10 MPa difference. This shows that changing the composition of the layer underlying the surface-conditioning buffer layer 930 does not substantially alter the stress of the thin film layer 940. Therefore, the surface-conditioning buffer layer 930 can establish a consistent interface surface independent of the composition and/or size of the underlying layer or layers.

TABLE I

| Film Stack | Stress at 0 degrees (MPa) | Stress at 90 degrees (MPa) |
|---|---|---|
| Si/Mo/SiO₂ | −85.21 | −110.01 |
|  | −107.62 | −121.62 |
| Si/Mo/Al₂O₃/SiO₂ | −142.93 | −145.47 |
|  | −149.85 | −144.20 |

TABLE I-continued

| Film Stack | Stress at 0 degrees (MPa) | Stress at 90 degrees (MPa) |
|---|---|---|
| Si/Al$_2$O$_3$/SiO$_2$ | −156.82<br>−160.66 | −151.67<br>−150.91 |

Figure 10:
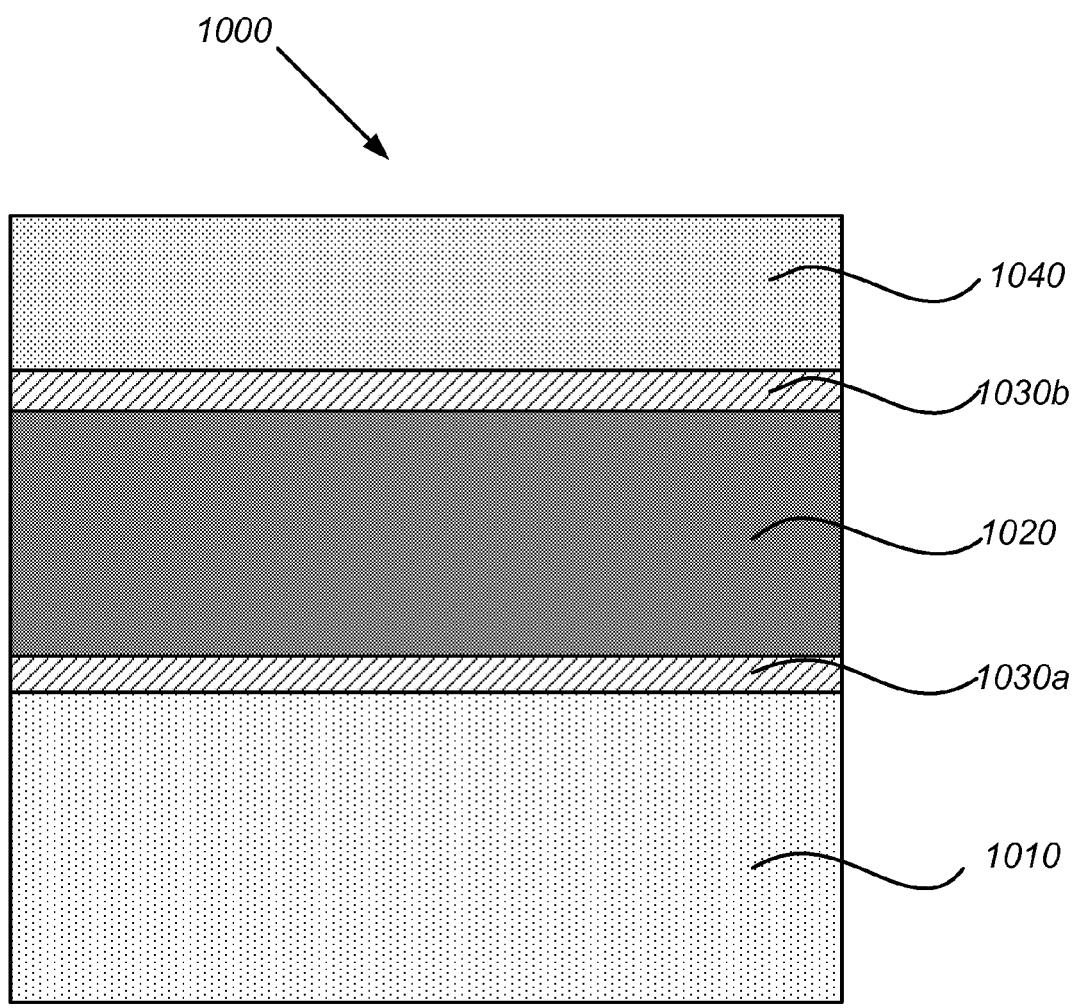
FIG. 10 shows an example of a cross-sectional schematic illustration of a surface-conditioning buffer layers alternatingly disposed between a plurality of thin film layers.

FIG. 10 shows an example of a cross-sectional schematic illustration of a thin film stack with surface-conditioning buffer layers alternatingly disposed between a plurality of thin film layers. The thin film stack 1000 can include a base layer 1010, a first thin film layer 1020 over the base layer 1010, and a second thin film layer 1040 over the first thin film layer 1020. Surface-conditioning buffer layers 1030a and 1030b can be between the base layer 1010 and the first thin film layer 1020, and between the first thin film layer 1020 and the second thin film layer 1040.

The base layer 1010 can have a thickness greater than about 10 nm. In some implementations, the base layer 1010 can be a substrate made of a semiconducting or insulating material, such as Si or SiO$_2$, or a sacrificial layer made of sacrificial material, such as Mo. The first thin film layer 1020 can have a thickness greater than about 10 nm. In some implementations, the first thin film layer 1020 can include any material formed by deposition techniques including but not limited to PVD, PECVD, thermal CVD, ALD, electroplating, or spin-coating. The second thin film layer 1040 can also have a thickness greater than about 10 nm, and can include any material formed by any of these deposition techniques. In some implementations, the first thin film layer 1020 and the second thin film layer 1040 can each have a thickness less than about 0.5 μm.

In some implementations, the surface-conditioning buffer layers 1030a and 1030b can be deposited by ALD under substantially the same deposition conditions and times. As a result, the surface-conditioning buffer layers 1030a and 1030b have the same or substantially the same compositions, physical properties, and thicknesses. In some implementations, the surface-conditioning buffer layers 1030a and 1030b can each have a thickness between about 1 nm and about 10 nm. In some implementations, the surface-conditioning buffer layers 1030a and 1030b can include an oxide, including but not limited to Al$_2$O$_3$, SiO$_2$, titanium oxide (TiO$_2$), tantalum oxide (Ta$_2$O$_5$), hafnium oxide (HfO$_2$), and zirconium oxide (ZrO$_2$).

The surface-conditioning buffer layers 1030a and 1030b can provide an ALD-deposited seed layer that establishes a uniform deposition surface for subsequent layers. ALD provides precise control on the composition and conformality of the surface-conditioning buffer layers 1030a and 1030b, and so can yield uniform and repeatable results. The ALD technique is well-suited for precise tailoring of very thin films with film growth as fine as about 0.01 nm per cycle.

To grow films by the ALD technique, a substrate can be placed in a reaction chamber where process conditions, including temperature and pressure, are adjusted to meet the requirements of the process chemistry and the substrate materials. In some implementations, the temperature is in the range of about 20° C. to about 600° C., and the pressure in the range of about 1 Pa to about 1000 Pa. A first precursor can be directed over the substrate and some of the first precursor chemisorbs onto the surface of the substrate to form a monolayer. A purge gas can be introduced to remove non-reacted precursors and gaseous reaction by-products. A second precursor can be introduced which can react with the monolayer of the first precursor, with a purge gas subsequently introduced to remove excess precursors and gaseous reaction by-products. This completes one cycle. The precursors can be alternately pulsed into the reaction chamber without overlap.

It will be understood that any of the ALD-deposited seed oxide layers (or other ALD-deposited seed layers) can be made using different combinations of precursors. For example, in some implementations, to deposit by ALD a layer of Al$_2$O$_3$, a first precursor of trimethylaluminum (TMA) may react with a second precursor of water vapor (H$_2$O). In some implementations, to deposit by ALD a layer of SiO$_2$, a first precursor of 3-aminopropyltriethoxysilane (EtO)$_3$Si(CH$_2$)$_3$NH$_2$ may react with a second precursor of H$_2$O, which may then react with a third precursor of ozone (O$_3$). Moreover, in some implementations, pulses of a single precursor that can decompose to form the desired ALD-deposited seed may be alternatingly introduced with purge gas pulses. In some implementations, precursors may be alternatingly pulsed into a reaction chamber without intervening pulses of purge gases.

The desired thickness of the ALD-deposited seed oxide layers can be controlled by the number of reaction cycles. One cycle may take time from about 0.5 seconds to a few seconds and deposit between about 0.01 nm and about 0.3 nm thickness of material. Thus, each of the ALD-deposited seed oxide layers in the range of about 1 nm and about 10 nm in thickness can be precisely tailored within 0.01 nm accuracy.

ALD can form surface-conditioning buffer layers 1030a and 1030b for several reasons. First, ALD can afford very precise control of the thickness of the surface-conditioning buffer layers 1030a and 1030b. Second, ALD is uniform and repeatable. Third, ALD is conformal such that the surface-conditioning buffer layers 1030a and 1030b can fully coat and isolate the surface under the ALD-deposited layer. By setting up a uniform deposition surface that is conformal, the interfacial stress of the subsequent layer will be substantially consistent and independent of the layer under the ALD-deposited layer. Furthermore, the surface-conditioning buffer layers 1030a and 1030b can establish a uniform deposition surface without chemically reacting with the underlying thin film layers.

Any of the surface-conditioning buffer layers 1030a and 1030b can include an oxide selected for a desired property. In some implementations, the oxide can be substantially transparent. In some implementations, the oxide can be chosen for its selectivity to various etch chemistries. For example, SiO$_2$ may be chosen because it can function as an etchable material under dry etching conditions. Surface-conditioning buffer layers 1030a and 1030b made of SiO$_2$ can be etched by reactive ion etching (RIE) using CF$_4$, CHF$_3$, and He gases to produce an anisotropic etch. While the surface-conditioning buffer layers 1030a and 1030b may be patterned and etched, it is typically not desirable to remove the surface-conditioning buffer layers 1030a and 1030b from the device structure they are a part of. In fact, the surface-conditioning buffer layers 1030a and 1030b remain in many of the device structures of, for example, resonators, cantilevers, balanced structures, gyroscopes, bolometers, accelerometers, and other MEMS devices and NEMS devices.

Each of the surface-conditioning buffer layers 1030a and 1030b can be formed under the same ALD conditions. For example, each of the surface-conditioning buffer layers 1030a and 1030b can be formed at least under the same pressure, temperature, precursors, and number of cycles. In some implementations, each of the surface-conditioning buffer layers 1030a and 1030b can have the same or substantially the same thickness and composition.

The surface-conditioning buffer layers 1030a and 1030b can provide a consistent interface surface when depositing subsequent layers for at least stress control of the subsequent layers. In effect, the surface-conditioning buffer layer 1030a over the base layer 1010 provides a stable starting condition for the deposition of the first thin film layer 1020, and the surface-conditioning buffer layer 1030b over the first thin film layer 1020 provides a repeated stable, or substantially similar, starting condition for the deposition of the second thin film layer 1040. As a result, the thin film stack 1000 can balance or tune the stresses layer by layer irrespective of the underlying layers. This kind of thin film stack 1000 can be applied to a number of device structures, including but not limited to resonators, cantilevers, balanced structures, gyroscopes, bolometers, accelerometers, and other MEMS devices and NEMS devices.

Figure 11:
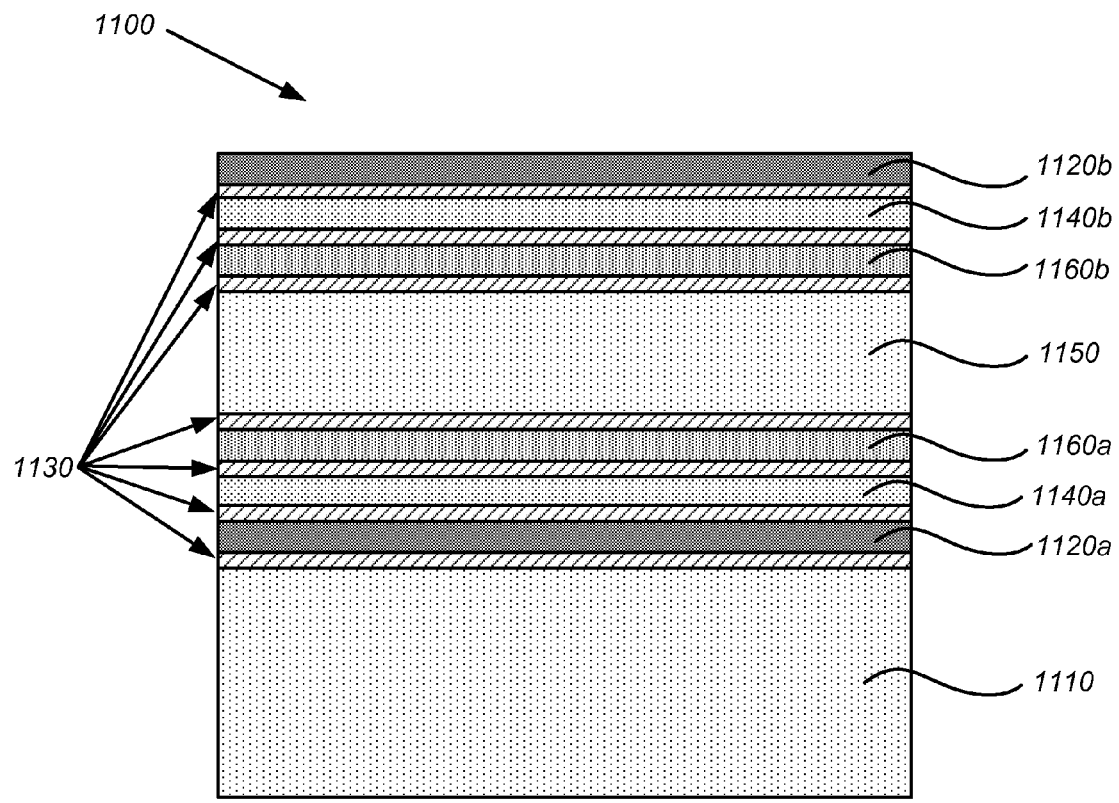
FIG. 11 shows an example of a cross-sectional schematic illustration of a balanced structure with surface-conditioning buffer layers alternatingly disposed between a plurality of thin film layers.

FIG. 11 shows an example of a cross-sectional schematic illustration of a balanced structure with surface-conditioning buffer layers alternatingly disposed between a plurality of thin film layers. The balanced structure 1100 can include a sacrificial layer 1110, a lower thin film stack having lower thin film layers 1120a, 1140a, and 1160a over the sacrificial layer 1110, a neutral plane layer 1150 over the lower thin film stack, and an upper thin film stack having upper thin film layers 1120b, 1140b, and 1160b over the neutral plane layer 1150. The upper thin film layers 1120b, 1140b, and 1160b and the lower thin film layers 1120a, 1140a, and 1160a can be symmetrically identical in thickness and composition across the neutral plane layer 1150.

The balanced structure 1100 further includes a plurality of surface-conditioning buffer layers 1130 alternatingly disposed or interleaved between each of the thin film layers 1120a, 1140a, 1160a, 1120b, 1140b, and 1160b. While the balanced structure 1100 without the surface-conditioning buffer layers 1130 is symmetric in design, the stress of each symmetric layer will not be consistent due to different underlying layers in the deposition sequence. Even if the deposition sequence is symmetric, the resulting stress of each identical material is not symmetric due to different underlying materials and surface conditions. In fact, given that each thin film of the same material will have a different underlying layer in the deposition sequence, having no surface-conditioning buffer layers 1130 gives rise to overall imbalances in stresses and stress gradients since the deposition starting condition for each layer is not the same. Depositing surface-conditioning buffer layers 1130 provides repeatable stable, or substantially similar, starting conditions for each of the thin film layers 1120a, 1140a, 1160a, 1120b, 1140b, and 1160b. Therefore, the balanced structure 1100 with surface-conditioning buffer layers 1130 can reduce undesirable bending and possible buckling from imbalances in stresses and stress gradients.

Moreover, because the surface-conditioning buffer layers 1130 can be very thin, for example, between about 1 nm and about 10 nm, the surface-conditioning buffer layers 1130 may have little structural impact on the balanced structure 1100. In some implementations, the surface-conditioning buffer layers 1130 can include a substantially transparent oxide so as to reduce its optical impact on the balanced structure 1100. In some implementations, the surface-conditioning buffer layers 1130 can include an etchable oxide such as $SiO_2$.

In certain implementations, the balanced structure 1100 can form part of an EMS device such as an IMOD. In some implementations, the balanced structure 1100 can form part of an analog IMOD. For example, the lower thin film layers 1120a, 1140a, and 1160a, the neutral plane layer 1150, and the upper thin film layers 1120b, 1140b, and 1160b can form a mirror structure in the analog IMOD.

In some implementations, the lower thin film layers can include a lower optical layer 1120a of $TiO_2$ with one or more index-matching sub-layers, a lower dielectric layer 1140a of SiON over the lower optical layer 1120a, and a lower reflective layer 1160a of Al, Cu, or alloys thereof over the lower dielectric layer 1140a. Each of the lower thin film layers 1120a, 1140a, and 1160a can have a thickness greater than about 10 nm. For example, the lower optical layer 1120a can have a thickness of about 28.5 nm, the lower dielectric layer 1140a can have a thickness of about 65 nm, and the lower reflective layer 1160a can have a thickness of about 30 nm.

Likewise, the upper thin film layers 1120b, 1140b, and 1160b can include an upper optical layer 1120b of $TiO_2$, an upper dielectric layer 1140b of SiON below the upper reflective layer 1120b, and an upper reflective layer 1160b of Al, Cu, or alloys thereof below the upper dielectric layer 1140b. Each of the upper thin film layers 1120b, 1140b, and 1160b can have a thickness greater than about 10 nm. For example, the upper optical layer 1120b can have a thickness of about 28.5 nm, the upper dielectric layer 1140b can have a thickness of about 65 nm, and the upper reflective layer 1160b can have a thickness of about 30 nm.

The neutral plane layer 1150 can include a thicker layer of SiON between the lower metal layer 1160a and the upper metal layer 1160b, which can provide structural rigidity to the mirror structure. In some implementations, the neutral plane layer 1150 of SiON can be between about 0.1 μm and about 2.0 μm thick, or greater than about 2.0 μm thick.

The sacrificial layer 1110 can be formed over a substrate (not shown), and can include an etchable material such as Mo. In some implementations, the thickness of the sacrificial layer 1110 can be selected to provide, after subsequent removal, a gap or cavity having a desired size. After removal of the sacrificial layer 1110, the IMOD is "released" so that the mirror structure can move across the gap between the substrate and the mirror structure. The surface-conditioning buffer layers 1130 may not significantly interfere with the movement of the mirror structure because of the thinness of the surface-conditioning buffer layers 1130 relative to the thin film layers in the mirror structure. It is understood that the description of the example of the balanced structure 1100 provided herein is for illustrative purposes only, and the technique is applicable to thin film layers of different thicknesses and compositions.

Figure 12:
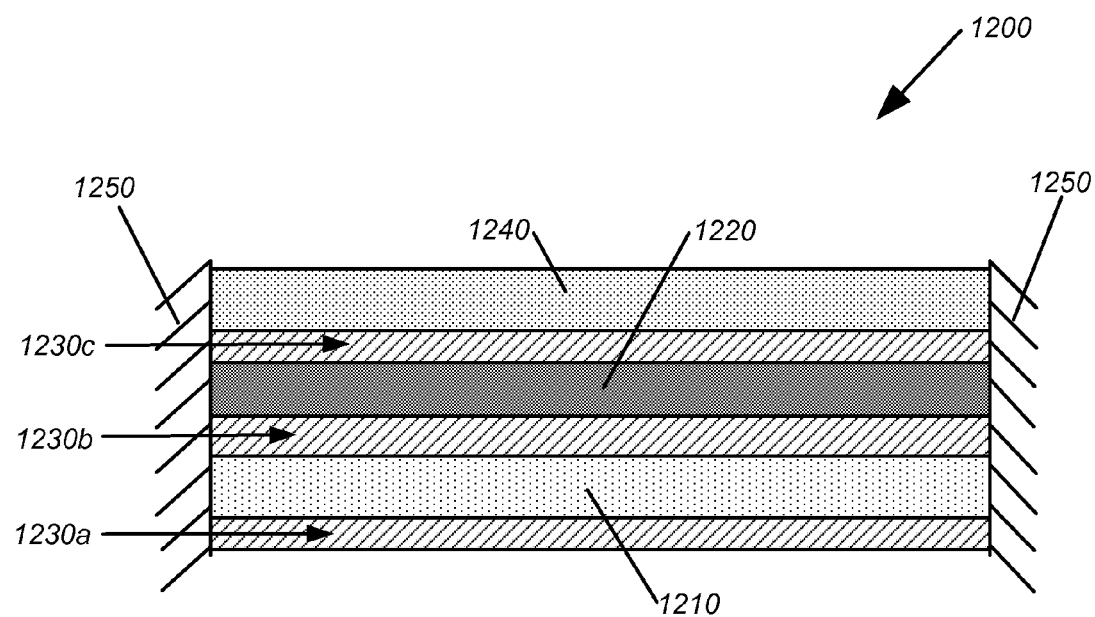
FIG. 12 shows an example of a cross-sectional schematic illustration of a resonator structure with surface-conditioning buffer layers alternatingly disposed between a plurality of thin film layers.

FIG. 12 shows an example of a cross-sectional schematic illustration of a resonator structure with surface-conditioning buffer layers alternatingly disposed between a plurality of thin film layers. In the example in FIG. 12, the resonator 1200 can include thin film layers 1210, 1220, and 1240 suspended between anchors 1250. A top thin film layer 1240 can be over a middle thin film layer 1220, and the middle thin film layer 1220 can be over a bottom thin film layer 1210. Surface-conditioning buffer layers 1230a, 1230b, and 1230c can be formed between the top thin film layer 1240 and the middle thin film layer 1220, between the middle thin film layer 1220 and the bottom thin film layer 1210, and below the bottom thin film layer 1210.

As illustrated in the example in FIG. 12, the resonator 1200 can be part of a MEMS resonator, such as a folded-beam suspended resonator. In the folded-beam suspended resonator, the top thin film layer 1240 can include an electrically conductive material, such as a metal. The middle thin film layer 1220 can include a semiconducting material, such as Si. The bottom thin film layer 1210 can include an electrically insulating material, such as an oxide. The folded-beam suspended resonator can have a resonant frequency $\omega_0$ that is a function of a spring constant k and an effective mass $M_{eff}$:

$$\omega_0 = \sqrt{(k/M_{eff})}$$

In some implementations, the spring constant k can be dependent on the residual in-plane stress in the thin film stack. The surface-conditioning buffer layers 1230*a*, 1230*b*, and 1230*c* can establish a uniform deposition surface for each of the thin film layers 1210, 1220, and 1240 so that each layer can be characterized and tuned independently to achieve substantially similar results when placed in a multi-stack configuration.

Figure 13:
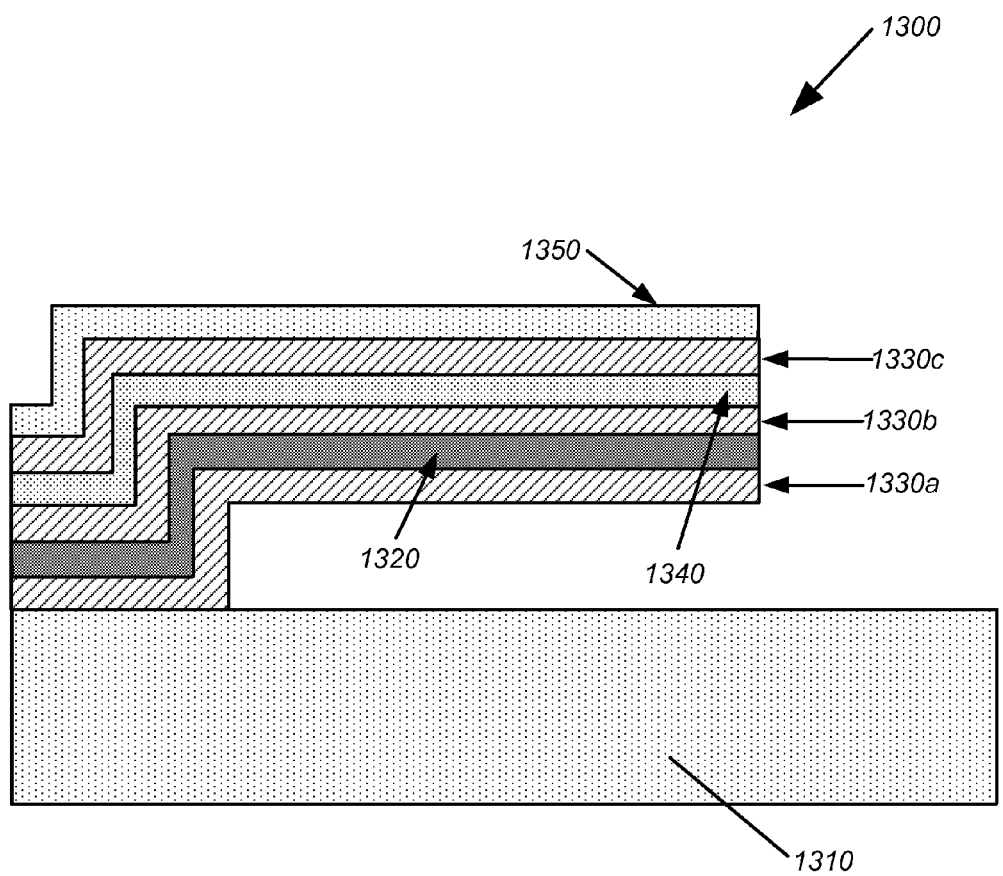
FIG. 13 shows an example of a cross-sectional schematic illustration of a cantilever structure with surface-conditioning buffer layers alternatingly disposed between a plurality of thin film layers.

FIG. 13 shows an example of a cross-sectional schematic illustration of a cantilever structure with surface-conditioning buffer layers alternatingly disposed between a plurality of thin film layers. In the example in FIG. 13, the cantilever 1300 can include thin film layers 1320, 1340, and 1350 over a substrate 1310. A top thin film layer 1350 can be over a middle thin film layer 1340, the middle thin film layer 1340 can be over a bottom thin film layer 1320, and the bottom thin film layer 1320 can be over the substrate 1310. Surface-conditioning buffer layers 1330*a*, 1330*b*, and 1330*c* can be formed between the top thin film layer 1350 and the middle thin film layer 1340, between the middle thin film layer 1340 and the bottom thin film layer 1320, and below the bottom thin film layer 1320. The cantilever 1300 can be anchored to the substrate 1310 at one end and separated by a gap at the other end. In some implementations, as illustrated in the example in FIG. 13, the cantilever 1300 can be part of a RF MEMS cantilever, such as a RF MEMS cantilever capacitive switch. In the RF MEMS cantilever capacitive switch, the top thin film layer 1350 can include an electrically conductive material, such as a metal. The middle thin film layer 1340 can include an electrically insulating material, such a dielectric. The bottom thin film layer 1320 can include an electrically conductive material, such as a metal. Thus, in some implementations, the structure of the cantilever 1300 can be a metal-insulator-metal (MIM) capacitive switch.

The RF MEMS cantilever capacitive switch can be designed to curl upwards to reduce the off-state capacitance. The upwards deflection of the cantilever 1300 can be determined at least in part by the vertical stress gradient through the thin film layers 1320, 1340, and 1350. This can be achieved by stress tuning each of the thin film layers 1320, 1340, and 1350. In some implementations, for example, the bottom metal layer 1320 can be tuned to be highly compressive, the dielectric layer 1340 can be tuned to be tensile, and the top metal layer 1350 can be tuned to be slightly compressive. Since the stress of the deposited material depends on the underlying material, the surface-conditioning buffer layers 1330*a*, 1330*b*, and 1330*c* can establish a uniform deposition surface for each of the thin film layers 1320, 1340, and 1350. Hence, each material can be measured, characterized, and tuned independently in terms of stress and/or other physical properties.

Figure 14:
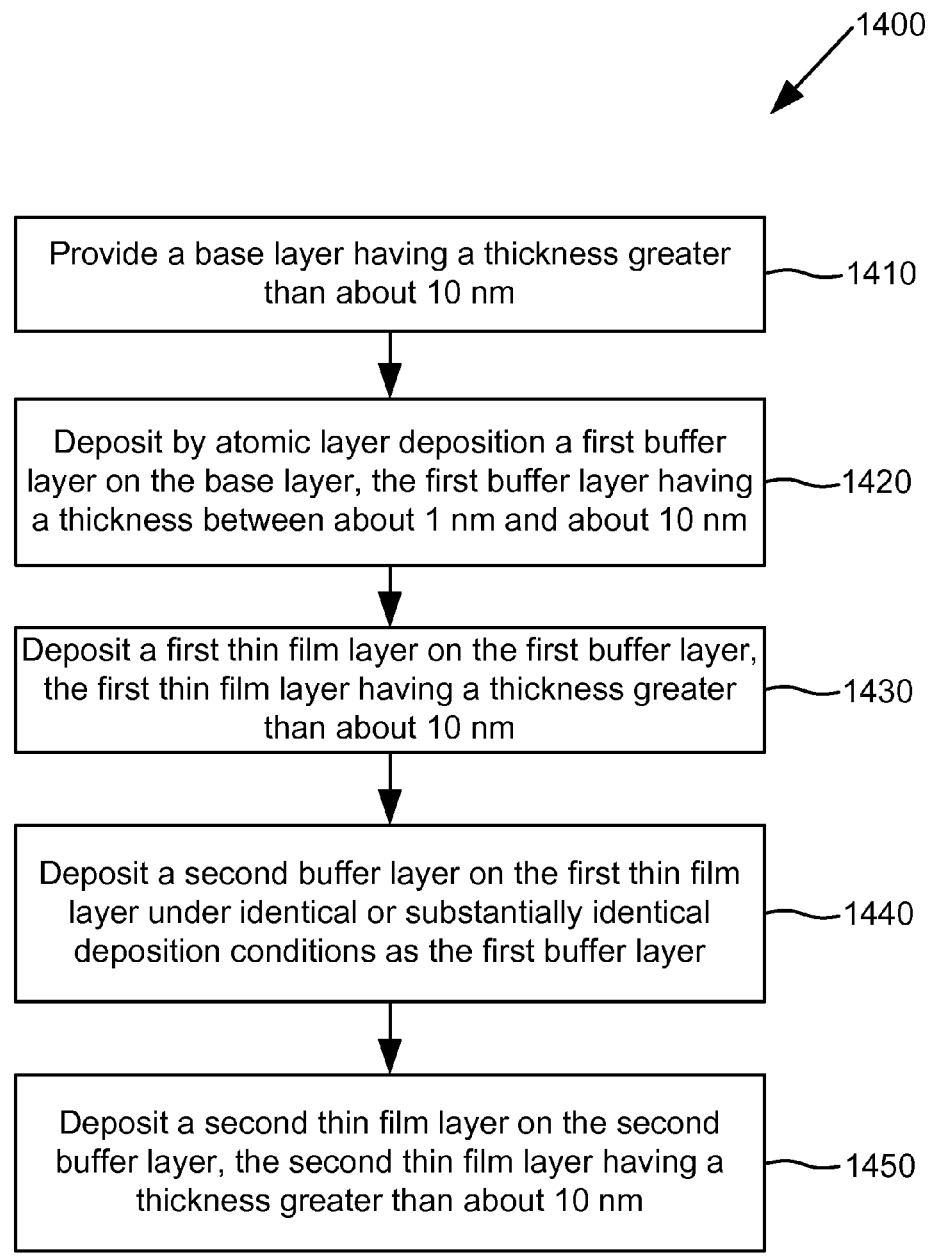
FIG. 14 shows an example of a flow diagram illustrating a method of manufacturing a thin film stack.

FIG. 14 shows an example of a flow diagram illustrating a method of manufacturing a thin film stack. It will be understood that additional processes may be present. For example, deposition of additional underlying or overlying layers can be achieved by various film deposition processes, such as PVD, PECVD, thermal CVD, ALD, spin-on coating, and electroplating. Patterning techniques, such as photolithography, can be used to transfer patterns on a mask to a layer of material. Etching processes can be performed after patterning to remove unwanted materials. Planarization processes such as "etch back" and chemical mechanical polishing (CMP) can be employed to create a substantially flat surface for further processing.

The process 1400 begins at block 1410 where a base layer having a thickness greater than about 10 nm is provided. As discussed earlier herein, the base layer can be a substrate formed of a semiconducting or insulating material, such as Si or $SiO_2$. The base layer can also be or include a conductive material, such as a metal. In some implementations, the base layer can be a sacrificial layer formed of sacrificial material, such as Mo.

The process 1400 continues at block 1420 where a first buffer layer is deposited by ALD on the base layer. The first buffer layer has a thickness between about 1 nm and about 10 nm. In some implementations, the first buffer layer provides a uniform deposition surface independent of the base layer. In some implementations, the first buffer layer includes an oxide.

The process 1400 continues at block 1430 where a first thin film layer is deposited on the first buffer layer. The first thin film layer has a thickness greater than about 10 nm. In some implementations, the first thin film layer has a thickness between about 10 nm and about 0.5 µm. The first thin film layer can be deposited by any suitable deposition technique known in the art. The first thin film layer can have a thin film stress value independent of the base layer.

The process 1400 continues at block 1440 where a second buffer layer is deposited by ALD on the first thin film layer. The second buffer layer is deposited under identical or substantially identical deposition conditions as the first buffer layer. In some implementations, the second buffer layer is identical or substantially identical in thickness and composition as the first buffer layer. In some implementations, the second buffer layer provides a uniform deposition surface independent of the first thin film layer and the base layer. In some implementations, the second buffer layer includes an oxide, including but not limited to $Al_2O_3$, $SiO_2$, $TiO_2$, and $Ta_2O_5$.

The process 1400 continues at block 1450 where a second thin film layer is deposited on the second buffer layer. The second thin film layer has a thickness greater than about 10 nm. In some implementations, the second thin film layer has a thickness between about 10 nm and about 0.5 µm. The second thin film layer can be deposited by any suitable deposition technique known in the art. The second thin film layer can have a thin film stress value independent of the first thin film layer and the base layer.

It will be understood that additional processes of depositing buffer layers followed by depositing thin film layers may be repeated. Such additional processes may be repeated as many times as desired in forming the thin film stack. Each of the buffer layers can be identical or substantially identical in thickness and composition as the other buffer layers.

Figure 15A:
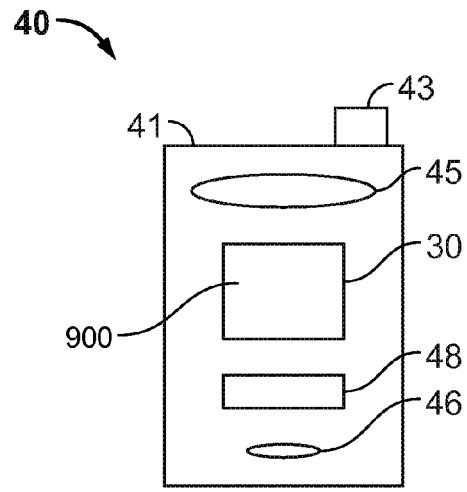
FIGS. 15A and 15B show examples of system block diagrams illustrating a display device that includes a plurality of interferometric modulators.
Figure 15B:
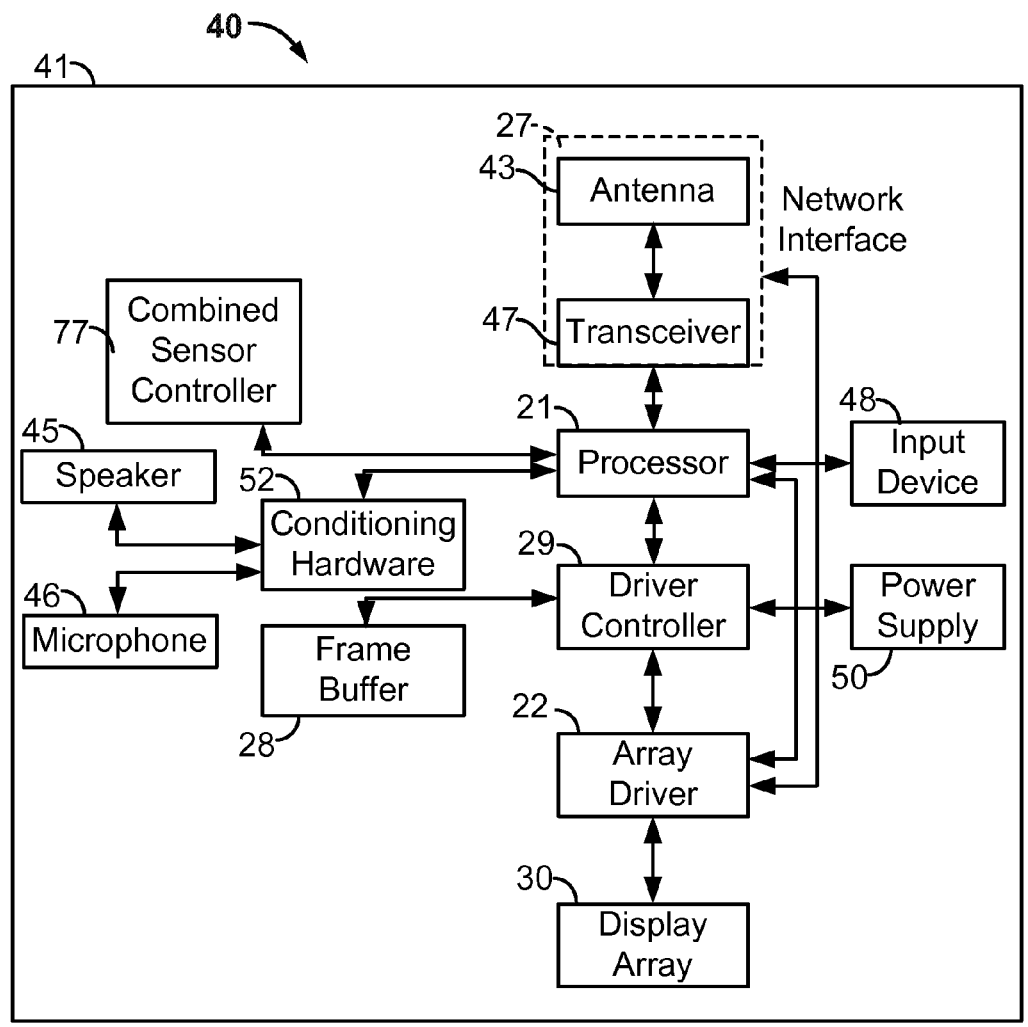

As indicated above, in some implementations, the thin film stacks including surface-conditioning layers can be implemented in display devices. FIGS. 15A and 15B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 15B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A thin film stack, comprising:
  a substrate;
  a first surface-conditioning buffer layer on the substrate;
  a plurality of thin film layers each having a thickness greater than about 10 nm over the first surface-conditioning buffer layer; and
  a plurality of second surface-conditioning buffer layers each having a thickness between about 1 nm and about 10 nm and alternatingly disposed between the plurality of thin film layers, wherein each of the plurality of second surface-conditioning buffer layers is formed with the same or substantially the same thickness and composition as the first surface-conditioning buffer layer, wherein each of the first and second surface-conditioning buffer layers includes an oxide.

2. The thin film stack of claim 1, wherein each of the surface-conditioning buffer layers is deposited by atomic layer deposition (ALD).

3. The thin film stack of claim 1, wherein each of the first and second surface-conditioning buffer layers includes at least one of aluminum oxide, silicon oxide, titanium oxide, and tantalum oxide.

4. The thin film stack of claim 1, wherein a thin film stress of each of the thin film layers disposed on a surface-conditioning buffer layer is independent of underlying thin film layers.

5. The thin film stack of claim 1, wherein the plurality of thin film layers includes:
  a lower thin film stack having one or more lower thin film layers over the first surface-conditioning buffer layer;
  a neutral plane layer over the lower thin film stack; and an upper thin film stack having one or more upper thin film layers and over the neutral plane layer, wherein the upper thin film layers and the lower thin film layers are symmetrically identical in thickness and composition across the neutral plane layer, and wherein one of the second surface-conditioning buffer layers is disposed between the lower thin film stack and the neutral plane layer, and another one of the second surface-conditioning buffer layers is disposed between the neutral plane layer and the upper thin film stack.

6. The thin film stack of claim 5, wherein the lower thin film stack, the neutral plane layer, and the upper thin film stack form part of an analog interferometric modulator (IMOD) mirror structure.

7. The thin film stack of claim 6, wherein the one or more lower thin film layers include:
   an optical layer of titanium oxide;
   a dielectric layer of silicon oxynitride over the reflective layer; and
   a reflective layer of aluminum or aluminum alloy over the dielectric layer.

8. The thin film stack of claim 1, wherein the plurality of thin film layers form part of a resonator.

9. The thin film stack of claim 8, wherein the plurality of thin film layers includes:
   an oxide layer over the first surface-conditioning buffer layer;
   a silicon layer over the oxide layer; and
   a metal layer over the semiconducting layer, wherein one of the second surface-conditioning buffer layers is disposed between the oxide layer and the silicon layer, and another one of the second surface-conditioning buffer layers is disposed between the silicon layer and the metal layer.

10. The thin film stack of claim 1, wherein the plurality of thin film layers form part of a cantilever.

11. The thin film stack of claim 10, wherein the plurality of thin film layers forms part of a radio-frequency microelectromechanical systems cantilever capacitive switch.

12. An apparatus that includes the thin film stack of claim 1, further comprising:
   a display;
   a processor that is configured to communicate with the display, the processor being configured to process image data; and
   a memory device that is configured to communicate with the processor.

13. The apparatus of claim 12, further comprising:
   a driver circuit configured to send at least one signal to the display; and
   a controller configured to send at least a portion of the image data to the driver circuit.

14. The apparatus of claim 12, further comprising:
   an image source module configured to send the image data to the processor, wherein the image source module includes at least one of a receiver, transceiver, and transmitter.

15. The apparatus of claim 12, further comprising:
   an input device configured to receive input data and to communicate the input data to the processor.

16. A thin film stack, comprising:
   a substrate;
   first means for providing a uniform deposition surface condition on the substrate having a thickness of between about 1 nm and about 10 nm;
   a plurality of thin film layers each having a thickness greater than about 10 nm over the first means for providing a uniform deposition surface condition; and
   second means for providing a uniform deposition surface condition alternatingly disposed between the plurality of thin film layers, the second means for providing a uniform deposition surface condition having the same or substantially the same thickness and composition as the first means for providing a uniform deposition surface condition between each of the thin film layers, wherein each of the first means and the second means for providing a uniform deposition surface condition includes an oxide.

17. The thin film stack of claim 16, wherein a thin film stress of each of the thin film layers disposed on a means for providing a uniform deposition surface condition is independent of underlying thin film layers.

18. The thin film stack of claim 16, wherein the plurality of thin film layers forms part of a resonator, cantilever, balanced structure, gyroscope, bolometer, accelerometer, microelectromechanical systems, or nanoelectromechanical systems device.

19. A method of manufacturing a thin film stack, comprising:
   providing a substrate having a thickness greater than about 10 nm;
   depositing by atomic layer deposition a first buffer layer on the base layer, the first buffer layer having a thickness between about 1 nm and about 10 nm, wherein the first buffer layer includes an oxide;
   depositing a first thin film layer on the first buffer layer, the first thin film layer having a thickness greater than about 10 nm;
   depositing a second buffer layer on the first thin film layer under identical or substantially identical deposition conditions as the first buffer layer;
   depositing a second thin film layer on the second buffer layer, the second thin film layer having a thickness greater than about 10 nm;
   depositing a third buffer layer on the second thin film layer under identical or substantially identical deposition conditions as the first buffer layer; and
   depositing a third thin film layer on the third buffer layer, the third thin film layer having a thickness greater than about 10 nm.

20. The method of claim 19, wherein each of the second buffer layer and third buffer layer is identical or substantially identical in thickness and composition as the first buffer layer.

21. The method of claim 19, wherein depositing by atomic layer deposition the first buffer layer includes providing a deposition surface independent of the substrate.

22. The method of claim 21, wherein depositing by atomic layer deposition the second buffer layer includes providing a deposition surface, for the second thin film layer, substantially identical to a deposition surface of the first buffer layer independent of the first thin film layer and the substrate.

23. An apparatus produced by the method as recited in claim 19.

* * * * *